United States Patent Office 3,548,600
Patented Dec. 22, 1970

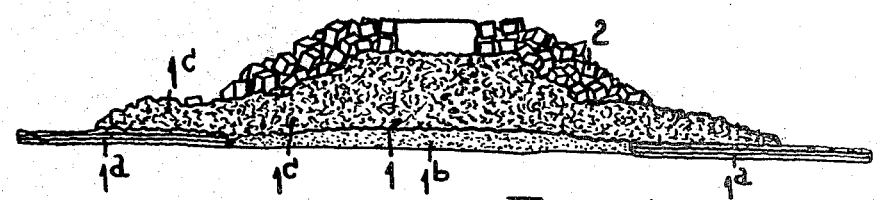
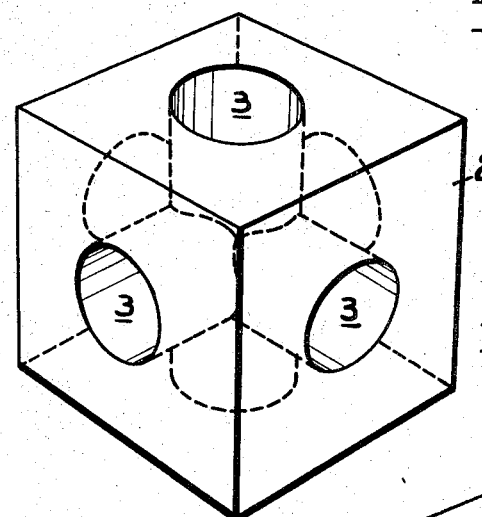
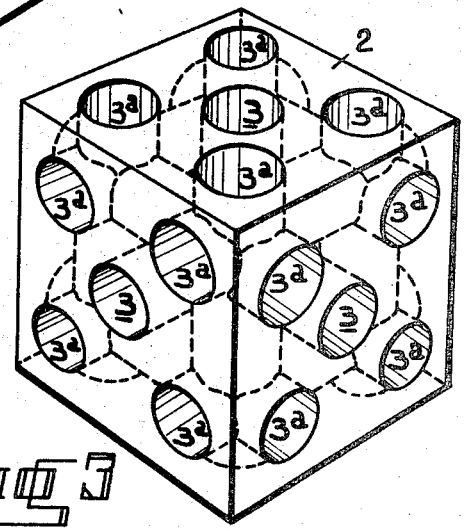

3,548,600
HYDRAULIC STRUCTURE FOR RESISTING WAVE ACTION
Jan Stolk, Jr., Rontgenstraat 2, and Johan Hendrik Stolk, Edisonstraat 47, both of Ijmuiden, Netherlands
Continuation-in-part of application Ser. No. 665,494, Sept. 5, 1967. This application Feb. 26, 1969, Ser. No. 872,781
Claims priority, application Netherlands, Sept. 5, 1966, 6612460
Int. Cl. E02b 3/06
U.S. Cl. 61—4                                     3 Claims

ABSTRACT OF THE DISCLOSURE

This hydraulic structure comprises an embankment having thereon a heap of concrete blocks, each of which is a six-sided quandrangular prism. Each edge of each block is at least one meter in length and is not more than 10% longer than any other edge of the block. Each side of each block has therein at least one opening the area of which is at least 1% of the total area of the side, the total area of the openings in each side being from 4 to 10% of the total area of the side. Leading inward from each opening is a passage which has a substantially uniform cross-sectional area equal to the area of the opening, and which is connected to a passage leading inward from the opposite side and to passages leading inward from at least some of the adjacent sides of the block. The weight of each block is at least 70% of the weight of a solid block of the same size, and the blocks are dropped at random in the heap with the sides of different blocks facing in different directions.

CROSS REFERENCE TO RELATED APPLICATIONS

This application is a continuation-in-part of application Ser. No. 665,494 filed Sept. 5, 1967 and now abandoned.

BACKGROUND OF THE INVENTION

This invention relates to hydraulic structures for resisting wave action, and more particularly to hydraulic structures erected upon embankments to form maritime breakwaters, jetties, dikes and the like, which are in locations where they are exposed to severe wave action to be resisted by such hydraulic structures.

The known hydraulic structures for resisting wave action are of three general types:

(1) Barriers erected offshore from beaches, for partially absorbing wave energy. Examples of such barriers are shown in U.S. Pat. No. 2,474,786 and French Pat. No. 730,189. Such barriers function to reduce the force of waves, so as to reduce erosion of beaches or cliffs.

(2) Hydraulic structures arranged regularly in a pattern, for protecting against relatively light and uniform wave action. Structures of this type are disclosed in U.S. Pat. No. 3,368,357 and Canadian Pat. No. 745,380. In these structures which are arranged in a regular pattern, the individual elements of the structures often have passages through which the water flows, and the individual elements having passages are always placed side-by-side in alignment with the passages extending parallel to the normal direction of flow of the current or waves. Such structures are used to protect the banks of rivers, lakes and other sheltered bodies of water in which the waves and currents are relatively light and regular. However, structural elements which are placed in regular alignment and which have passages extending parallel to the normal direction of water flow are not suitable for protecting a dike or embankment which must withstand the full force of violent wave action, such as the wave action that occurs during storms along the North Sea coast of the Netherlands. In such violent wave action, the flow of the water is not regularly in one direction, but is a violently agitated flow with no uniformity of direction.

(3) Structures for absorbing the full force of violent wave action. These structures are not intended merely to reduce erosion of cliffs or beaches, but are intended to receive and absorb the full force of violent wave action. Examples of such structures are dikes along the sea coast of the Netherlands, which are not backed up by cliffs or high grounds, but often serve as barriers to hold back the sea from reclaimed low land which lies below sea level.

In order to withstand the full force of violent wave action, a dike or other embankment must be extremely strong and rugged, and must have a very large cross-section. It is not economically feasible to protect such a structure from wave action by means of a covering of structural elements arranged in a regular pattern, because a foundation of concrete or masonry which would be required to support a regular pattern of wave-resisting elements would be extremely expensive in view of the large cross-section of the dike or other structure, and in view of the fact that the dike may extend for many miles along the coast line to be protected.

Thus a dike for withstanding the full force of violent wave action usually comprises a bank of stones or crushed rock, in front of which is a protective heap or layer, made up of individual structural elements, for absorbing the force of the waves. This heap of structural elements is constructed by dropping the individual elements upon the heap, and the resulting random arrangement of the individual elements is very effective in absorbing the energy of the random currents which occur in violent wave action.

In such a protective heap or covering, consisting of individual elements which have been dropped at random upon an embankment, a serious problem is created by the tendency of the violent wave action to lift and dislodge the individual structural elements. In an attempt to solve this problem, the individual elements which are dropped at random upon an embankment to form a wave-resisting layer have been constructed of concrete, and have been made cubical in form so as to present a minimum area per unit of volume. Since the total surface area of a cube varies as the square of the length of one edge, while the total volume varies as the cube of the length of one edge, these cubical concrete blocks have been made very large, with an edge as long as two meters, in an attempt to provide sufficient weight per unit of surface area to prevent the blocks from being dislodged by violent wave action. However, it has been found that the pressures which may be locally exerted on such blocks with heavy wave movements may reach such values that the blocks are displaced or lifted from their "seats," depending on whether the "over pressure" is acting on the blocks in a substantially upward and/or lateral direction. Such things in particular occur with blocks composed of cement, sand and gravel and having a specific gravity of about 2.

It has been proposed to solve this problem by making the blocks heavier, e.g. by applying a very good grading of the aggregates in concrete of good quality. By doing so the specific gravity could be leveled up to about 2.35 which value, however, has appeared to be not enough to prevent the above occurrences in an effective manner.

With heavy wave movements a stable seat holding of the blocks is ensured only with a specific gravity of about 2.8, which can be achieved by using lead slags as aggregates. Heavy aggregates of this kind, however, are scarce, while it is not possible in any other way to construct a solid block which is sufficiently heavy, homogeneous and of sufficient strength.

SUMMARY OF THE INVENTION

The object of the present invention is to provide a block which is an improvement on the above mentioned blocks and which is adapted to be dropped at random on the embankment to be protected and which has excellent seat-holding properties.

The block used in the practice of the present invention not only is substantially more stable under violent wave action but also is lighter in weight than a solid concrete block having the same outer dimensions. The present block does not require the use of lead slags, but can be made of ordinary concrete. In fact, the amount of concrete used in constructing the present block is less than the amount of concrete used in constructing a solid concrete block having the same outer dimensions.

The block used in the practice of the invention has at least one passage opening at each of the sides of the block and affording communication of said side with the opposite side and at least some of the adjacent sides.

It will be understood that this block, after having been dropped at random on the embankment to be protected, will always present a "pressure-reducing" hole at the side against which the water tends to build up an overpressure. Moreover this overpressure may "leak off" not only toward the opposite side, but also toward the adjacent sides of the block so that under all circumstances, e.g. when the opening at the opposite side is blocked for some reason, an effective reduction of the overpressure tending to build up on a side is ensured.

BRIEF DESCRIPTION OF THE DRAWINGS

FIG. 1 is a cross-sectional view of a jetty;

FIG. 2 is a perspective view of a block which may be used in the practice of the invention;

FIG. 3 is a perspective view of another form of block which may be used in the practice of the invention.

DESCRIPTION OF THE PREFERRED EMBODIMENTS

With reference to FIG. 1 the jetty shown therein comprises an embankment 1, composed of sunk mattresses 1a, gravel 1b and stones 1c. The embankment 1 is protected in accordance with the invention by a layer of artificial blocks 2 which have been dropped at random and are irregularly positioned one relative to the other.

The form of block used in the practice of the present invention is a six-sided quadrangular prism, each edge of which is at least one meter in length. The block is substantially cubical in that each edge of the block is not more than 10% longer than any other edge. Each side of the block has therein at least one opening the area of which is at least 1% of the total area of the side, the total area of the openings in each side being from 4 to 10% of the total area of the side. Leading inward from each opening is a passage which has a substantially uniform cross-sectional area equal to the area of the opening, and which is connected to a passage leading inward from the opposite side and to passages leading inward from at least some of the adjacent sides of the block. Preferably the passages in each block form an orthogonal co-ordinate system.

In the preferred embodiment, shown in FIG. 2, each two opposite sides of a cubical block 2 are in communication with each other by a single relief passage 3. The axes of the three passages 3 intersect in the center of the block so that not only a pressure relief will occur between each two opposite sides but also a pressure relieving action will take place between one side and each of the adjacent sides of the block.

Due to the presence of the relief passages 3 the block of the present invention is lighter in weight than a solid block having the same external shape and dimensions. Although lighter in weight than a solid block of the same shape and dimensions, the present block is substantially more stable when exposed to violent wave action. In a block according to the invention a specific gravity of e.g. 2.3 is enough to assure an effective holding of the block even under heavy wave action. As a matter of fact the freedom of choice with regard to the value of the specific gravity and the quality of the concrete used in the present block is substantially enlarged.

In the embodiment according to FIG. 3 three additional sets of four relief passages 3a are provided in addition to the three central relief passages 3. In the embodiment of FIG. 3 each of the additional relief passages 3a intersects four additional relief passages merging from the adjacent sides. The embodiment of FIG. 3 is only one example of various possible forms of the block. It will be understood that concrete blocks of large dimensions will have to be reinforced. It is often useful to form a special collecting space at each point of intersection between the various relief passages so as to reduce to a minimum the interference between the relieving streams arising from various directions. However, the total volume occupied by the passages and any collecting space in the block should not be more than 30% of the total volume of the block, so that the weight of the block is at least 70% of the weight of a solid block of the same size and shape, made of the same material.

Although the total area of the openings in each side of the block may be from 4 to 10% of the total area of the side, best results are obtained by using a block having the structure shown in FIG. 2, in which the total cross-sectional area of each opening 3 is about 8% of the total area of one side of the block.

A typical block of the form shown in FIG. 2 is one in which the width is 1.2 meters, and the diameter of the openings 3 is 35 centimeters.

A still larger block of the form shown in FIG. 2, which has been used to form wave-resisting coverings for sea walls along the coast of the Netherlands, has a width of 2 meters and has passages which are 45 centimeters in diameter. In this block the cross-sectional area of each opening is approximately 4% of the total area of a side of the block.

A still more stable block, which also has been used to form protective coverings for sea walls along the coast of the Netherlands, has a width of 2.2 meters and is cubical in form, with passages arranged as shown in FIG. 2 and having a diameter of 70 centimeters.

A still larger block, which is being used to construct a wave-resisting structure embodying the invention near Scheveningen on the North Sea, where the wave action is particularly violent, has the form shown in FIG. 2, with a width of 2.8 meters, and with passages having a diameter of 90 centimeters.

We claim:

1. A hydraulic structure for resisting wave action, comprising an embankment having thereon a protective heap of concrete blocks each of which is a six-sided quadrangular prism, each edge of which is at least one meter in length and is not more than 10% longer than any other edge, each side of each block having therein at least one opening the area of which is at least one percent of the total area of the side, the total area of such openings in each side being from 4 to 10% of the total area of the side, and a passage leading inward from each opening, which has a substantially uniform cross-sectional area equal to the area of the opening, and which is connected to a passage leading inward from the opposite side and to passages leading inward from at least some of the adjacent sides of the block, the weight of each block being at least 70% of the weight of a solid block of the same material, size and shape, and the blocks being dropped at random in the heap and being irregularly disposed relative to one another.

2. A hydraulic structure according to claim 1 wherein the passages in each block form an orthogonal coordinate system.

3. A hydraulic structure according to claim 1 wherein a plurality of passages in each block meet in a common collecting space.

References Cited

UNITED STATES PATENTS

| | | | |
|---|---|---|---|
| 3,091,087 | 5/1963 | Danel | 61—4 |
| 3,096,621 | 7/1963 | Danel | 61—4 |
| 3,386,250 | 6/1968 | Katayama | 61—3 |

FOREIGN PATENTS

| | | | |
|---|---|---|---|
| 758,321 | 5/1967 | Canada | 61—3 |

JACOB SHAPIRO, Primary Examiner

U.S. Cl. X.R.

61—37